United States Patent
Kim et al.

(10) Patent No.: US 11,598,137 B2
(45) Date of Patent: Mar. 7, 2023

(54) SYSTEM AND METHOD FOR PREVENTING INTERFERENCE BETWEEN OPPOSITE SLIDING DOORS AND WHEEL

(71) Applicants: Hyundai Motor Company, Seoul (KR); Kia Motors Corporation, Seoul (KR)

(72) Inventors: Jun-Hyuk Kim, Seongnam-si (KR); Hyung-In Yun, Seoul (KR); Hee-Tae Yang, Changwon-si (KR); Seok-Min Kim, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 566 days.

(21) Appl. No.: 16/678,150

(22) Filed: Nov. 8, 2019

(65) Prior Publication Data
US 2020/0173218 A1    Jun. 4, 2020

(51) Int. Cl.
*E05F 15/00* (2015.01)
*E05F 15/40* (2015.01)

(52) U.S. Cl.
CPC ......... *E05F 15/40* (2015.01); *E05Y 2400/322* (2013.01); *E05Y 2400/44* (2013.01); *E05Y 2400/54* (2013.01); *E05Y 2400/854* (2013.01); *E05Y 2900/531* (2013.01)

(58) Field of Classification Search
CPC ..... B60J 5/047; E05F 15/40; E05Y 2400/322; E05Y 2400/854; E05Y 2400/44; E05Y 2400/54
USPC ....... 49/209, 223, 260; 296/155, 146.1, 147, 296/146.4, 146.9, 146.11, 146.02
See application file for complete search history.

(56) References Cited

U.S. PATENT DOCUMENTS

| | | | |
|---|---|---|---|
| 7,810,864 B2* | 10/2010 | Shimizu | E05F 15/44 296/146.4 |
| 8,096,605 B2 | 1/2012 | Heuel et al. | |
| 9,767,629 B1* | 9/2017 | Gulati | G07C 9/00182 |
| 10,429,430 B2* | 10/2019 | Wuerstlein | G01R 31/66 |
| 10,649,061 B2* | 5/2020 | Bjorkengren | H04W 4/029 |
| 10,876,341 B2* | 12/2020 | Taylor | E05F 15/41 |

(Continued)

FOREIGN PATENT DOCUMENTS

| | | |
|---|---|---|
| JP | 2007-038873 A | 2/2007 |
| JP | 2016-147508 A | 8/2016 |
| KR | 10-2011-0089753 A | 8/2011 |

*Primary Examiner* — Chi Q Nguyen
(74) *Attorney, Agent, or Firm* — Morgan, Lewis & Bockius LLP (57) ABSTRACT

A system includes: a door opening/closing switch which receives, from a user, a manipulation instruction for opening or closing the door; a door position sensor which detects a position of the door; a steering controller which measures a steering angle of the vehicle; a door controller which receives, from the door opening/closing switch, the manipulation signal for opening or closing the door, receives door position information from the door position sensor, receives steering angle information from the steering controller, and determines that the door and the wheel are in an interference state when the wheel is not in an aligned state in which the wheel is parallel to a longitudinal direction of the vehicle, when the user attempts to open the door; and a warning device which warns the user of a situation when the door controller determines that the door and the wheel are in the interference state.

9 Claims, 5 Drawing Sheets

(56) References Cited

U.S. PATENT DOCUMENTS

| | | | |
|---|---|---|---|
| 11,080,652 B2* | 8/2021 | Chen | G06Q 30/04 |
| 11,320,824 B2* | 5/2022 | Niikuni | B60J 5/06 |
| 2007/0266635 A1* | 11/2007 | Sugiura | E05F 15/43 |
| | | | 49/27 |
| 2008/0184623 A1* | 8/2008 | Heigl | E05F 15/73 |
| | | | 49/31 |
| 2013/0106435 A1* | 5/2013 | Mori | G01B 7/14 |
| | | | 324/612 |
| 2015/0033630 A1* | 2/2015 | Oakley | E05B 41/00 |
| | | | 49/31 |
| 2015/0106105 A1* | 4/2015 | Clough | G07C 9/30 |
| | | | 704/275 |
| 2018/0339676 A1* | 11/2018 | Lazarini | H04W 4/40 |

* cited by examiner

SYSTEM AND METHOD FOR PREVENTING INTERFERENCE BETWEEN OPPOSITE SLIDING DOORS AND WHEEL

CROSS-REFERENCE TO RELATED APPLICATIONS

The present application claims the benefit of priority to Korean Patent Application No. 10-2018-0152560, filed on Nov. 30, 2018 in the Korean Intellectual Property Office, the entire disclosure of which is incorporated herein by reference.

TECHNICAL FIELD

The present disclosure relates to a system and a method for preventing interference between opposite sliding doors and a wheel which are applied when all front and rear doors of a vehicle are sliding doors. More particularly, the present disclosure relates to a system and a method which may determine whether the wheel is in an aligned state in which the wheel is parallel to a longitudinal direction of the vehicle, and may warn a user when the wheel is not in the aligned state, thereby preventing damage to the door.

BACKGROUND

Recently, in order to introduce autonomous vehicles and optimize conditions that allow occupants to get in or out of the vehicles in narrow spaces, there is a need for developing opposite sliding doors that may be applied to all front and rear doors of a vehicle so that the front and rear doors are opened in a sliding manner.

However, for the opposite sliding doors, the front door may be opened while the door is sliding toward a front side of the vehicle. As a result, if the front wheel is not in an aligned state where the wheel is parallel to a longitudinal direction of the vehicle, there is a risk that the wheel and the door may collide with each other when the door is being opened.

In this regard, Korean Patent Application Laid-Open No. 10-2011-0089753 in the related art (Device and Method for Controlling Vehicle Door) relates to a device and a method for controlling a vehicle door and provides the device and the method for preventing a collision between the vehicle door and a peripheral object as a vehicle door control system, which includes a sensor for measuring a distance between each of the doors and the peripheral object and a microcomputer for controlling an opening angle of the door, is provided on each of the doors.

However, the system and the method in the related art are applied to swing type front and rear doors, detect an obstacle spaced apart from the vehicle body, and control the opening angles of the doors, and as a result, the system and the method cannot be applied to sliding type doors that may collide with front wheels of the vehicle when the doors are being opened.

SUMMARY

The present disclosure has been made in an effort to provide a system and a method for preventing interference between opposite sliding doors and a wheel, in which in a device and a method for controlling a vehicle door in the related art, when a user opens opposite sliding doors, a door controller determines whether the wheel is in an aligned state in which the wheel is parallel to a longitudinal direction of the vehicle, based on an operating state of the door and a steering angle of the vehicle, and when the wheel is not in the aligned state, the door controller restricts the steering angle of the vehicle, and warns the user.

According to an exemplary embodiment of the present disclosure, a system for preventing interference between a sliding door and a wheel, which prevents a collision between the wheel and the door when the door of a vehicle is opened or closed, may include: a door opening/closing switch which receives, from a user, a manipulation instruction for opening or closing the door; a door position sensor which detects a position of the door; a steering controller which measures a steering angle of the vehicle; a door controller which receives, from the door opening/closing switch, the manipulation signal for opening or closing the door, receives door position information from the door position sensor, receives steering angle information from the steering controller, and determines that the door and the wheel are in an interference state when the wheel is not in an aligned state in which the wheel is parallel to a longitudinal direction of the vehicle, when the user attempts to open the door; and a warning device which warns the user of a dangerous situation when the door controller determines that the door and the wheel are in the interference state.

When the door controller determines that the wheel and the door are in the interference state, based on a position of the door or an opening/closing operation state of the door and a position of the wheel, the steering controller may restrict the steering angle to a range in which the wheel and the door do not collide with each other.

The warning device may further include: an indication controller which visually warns the user of the interference state; and a buzzer which generates a warning sound about the interference state to the user.

When the door and the wheel are not in the interference state, the door controller may open or close the door by a motor.

According to another exemplary embodiment of the present disclosure, a method of preventing interference between opposite sliding doors and a wheel, may include: a first step of transmitting, by a door opening/closing switch, a user's manipulation signal for opening or closing the door to a door controller; a second step of transmitting, by a door position sensor, door position information to the door controller and transmitting, by a steering controller, steering angle information to the door controller; a third step of determining, by the door controller, whether the wheel and the door are in an interference state, based on whether the wheel is in an aligned state in which the wheel is parallel to a longitudinal direction of a vehicle; and a fourth step of warning, by a warning device, a user of the interference state when the door and the wheel are in the interference state or operating, by a motor, the door when the door and the wheel are not in the interference state.

The third step may further include: a process of determining whether the wheel is in the aligned state; and a process of determining whether a radius of rotation of the wheel is in a region in which the door is operable.

In the fourth step, when the radius of rotation of the wheel is in a region in which the door is operable, an indication controller may generate a visual warning, and simultaneously, a buzzer may generate a discontinuous warning sound, and when the radius of rotation of the wheel is in a region in which the door is inoperable, the indication controller may generate a visual warning, and simultaneously, the buzzer may generate a continuous warning sound.

In the interference state, the steering controller may restrict a steering angle of the vehicle to a range in which the door and the wheel do not collide with each other.

The buzzer may output the discontinuous warning sound having a generation period that increases as the wheel becomes closer to the aligned state.

According to the present disclosure configured as described above, there is an advantage in that a user may perceive a risk of a collision between a front wheel and a front door of a swing door of a vehicle in the related art, and as a result, a sliding type door may be safely used as the front door.

According to the present disclosure, there is an advantage in that even though the user attempts to open the sliding door without perceiving a state of the wheel, the user may perceive a risk of a collision between the wheel and the sliding door by means of a warning sound or warning messages.

According to the present disclosure, there is an advantage in that warning methods vary depending on a degree of risk of a collision between the wheel and the sliding door, and as a result, the user may perceive a degree of risk of the collision between the wheel and the door.

DETAILED DESCRIPTION

Hereinafter, the present disclosure will be described in detail with reference to the accompanying drawings. However, the present disclosure is not restricted or limited by exemplary embodiments. Like reference numerals indicated in the respective drawings refer to members which perform substantially the same functions.

An object and an effect of the present disclosure may be naturally understood or may become clearer from the following description, and the object and the effect of the present disclosure are not restricted only by the following description. In addition, in the description of the present disclosure, the specific descriptions of publicly known technologies related with the present disclosure will be omitted when it is determined that the specific descriptions may unnecessarily obscure the subject matter of the present disclosure.

Figure 1:
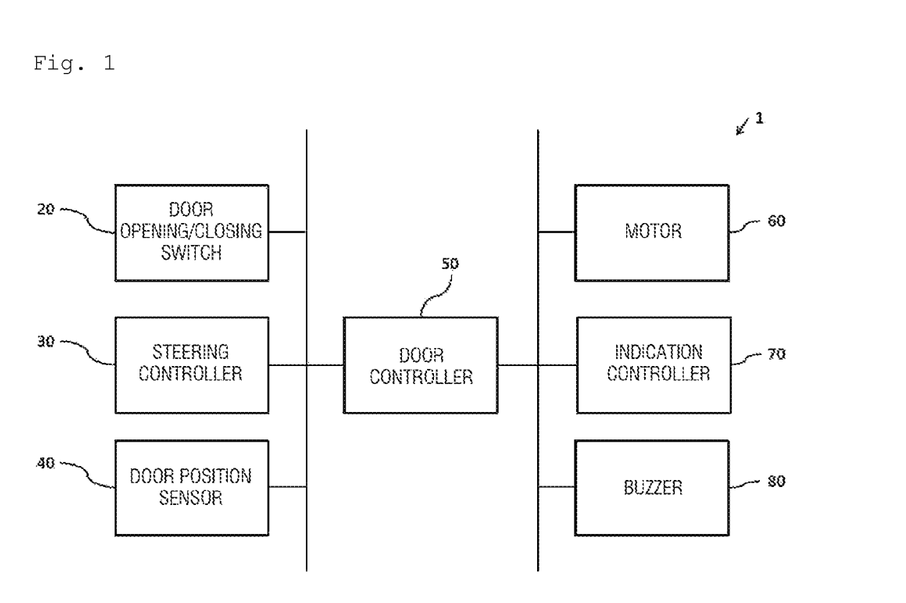
FIG. 1 is a view illustrating an entire configuration of a system for preventing interference opposite sliding doors and a wheel according to one aspect of the present disclosure.

FIG. 1 illustrates an entire configuration of a system for preventing interference opposite sliding doors and a wheel according to one aspect of the present disclosure.

Referring to FIG. 1, a system for preventing interference between opposite sliding doors and a wheel according to one aspect of the present disclosure may include a door opening/closing switch 20, a door position sensor 40, a steering controller 30, a door controller 50, a motor 60, and a warning device.

The steering controller 30 and door controller 50 of the system according to an exemplary embodiment of the present disclosure may be a processor (e.g., computer, microprocessor, CPU, ASIC, circuitry, logic circuits, etc.).

The controller may be implemented by a non-transitory memory storing, e.g., a program(s), software instructions reproducing algorithms, etc., which, when executed, controls operations of various components (e.g., a steering wheel, a door, etc.) of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The door opening/closing switch 20 is mounted on the door, receives, from a user, a manipulation instruction for opening or closing the doors in order to open or close the sliding doors in opposite directions, and transmits, to the door controller 50, a manipulation signal for opening or closing the doors.

The door position sensor 40 is mounted on the door, detects a position of the door, and transmits door position information to the door controller 50.

The steering controller 30 measures a steering angle of a vehicle and transmits steering angle information to the door controller 50. As the driver steers the vehicle, front wheels are rotated proportionally, and as a result, it is possible to acquire a rotation angle of the wheel 10 by measuring the steering angle. In addition to the steering controller 30, a sensor for directly measuring the rotation angle of the wheel 10 may be utilized to measure the rotation angle and whether the wheel 10 rotates.

When a user attempts to open the door, the door controller 50 may receive, from the door opening/closing switch 20, the manipulation signal for opening or closing the door, receive the door position information from the door position sensor 40, and receive the steering angle information from the steering controller 30.

Based on the steering angle information, the door controller 50 determines that the wheel 10 is in an aligned state in which the wheel 10 is parallel to a longitudinal direction of the vehicle, in a case in which the steering angle is '0', and the door controller 50 determines that the wheel 10 is in an interference state, in a case in which the steering angle is not '0'.

In a case in which the door controller 50 determines that the wheel 10 is in the aligned state, the door controller 50 transmits aligned state information to the motor 60 to enable the motor 60 to open the door.

In contrast, in a case in which the door controller 50 determines that the wheel 10 is not in the aligned state, the door controller 50 determines that the door and the wheel 10 are in the interference state and transmits interference state information to the steering controller 30 and the warning device.

The steering controller 30, which has received the interference state information, may restrict the steering angle so that a rotation region of the wheel 10 is in a region in which the wheel 10 does not collide with the door.

The warning device according to the present disclosure serves to warn the user of a dangerous situation when the door controller 50 determines that the door and the wheel 10 are in the interference state, and the warning device may include an indication controller 70 and a buzzer 80.

The indication controller 70 visually warns the user of the interference state through an interference warning text on a display in the vehicle. The buzzer 80 generates a warning sound about the interference state to the user. The indication controller 70 of the warning device according to an exemplary embodiment of the present disclosure may be a processor (e.g., computer, microprocessor, CPU, ASIC, circuitry, logic circuits, etc.). The indication controller 70 may be implemented by a non-transitory memory storing, e.g., a program(s), software instructions reproducing algorithms, etc., which, when executed, controls operations of the warning device of the vehicle, and a processor configured to execute the program(s), software instructions reproducing algorithms, etc.

As described below, the warning device according to one aspect of the present disclosure changes warning methods depending on a degree of risk of a collision between the wheel 10 and the sliding door, thereby enabling the user to perceive a degree of risk of the collision between the wheel 10 and the door.

Figure 2:
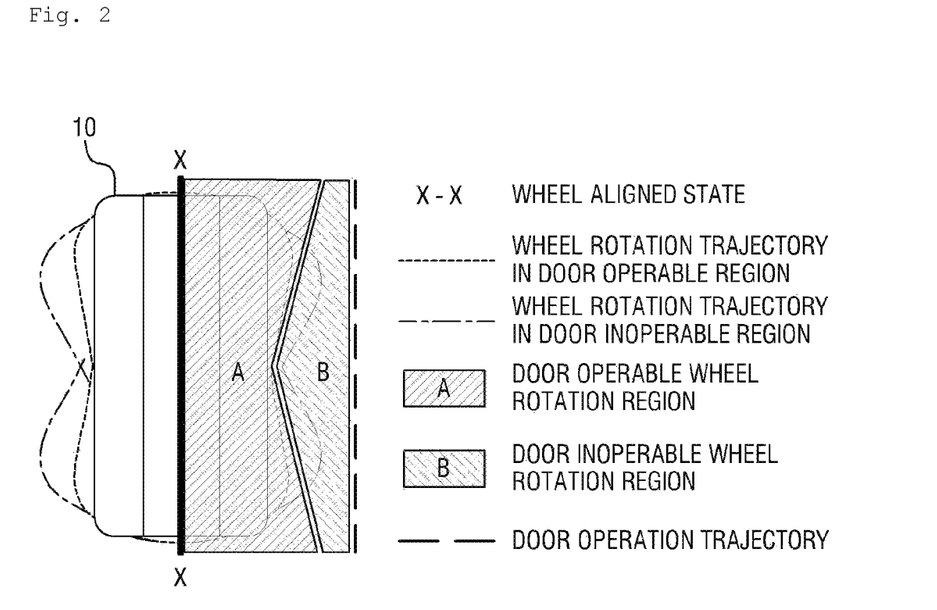
FIG. 2 is a flowchart of a method of preventing interference between the opposite sliding doors and the wheel according to one aspect of the present disclosure.
Figure 3:
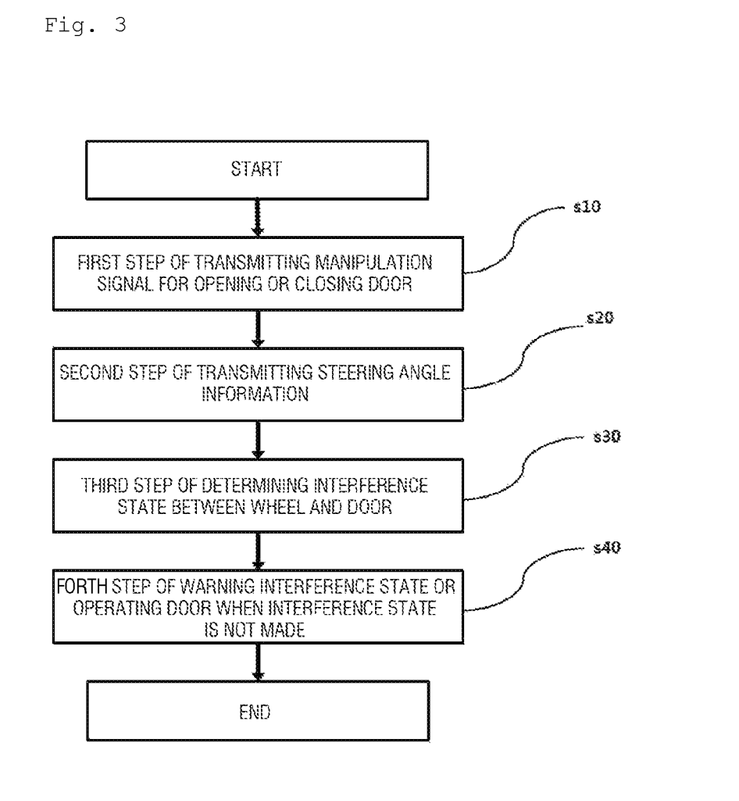
FIG. 3 is a view illustrating a specific process of a third step according to one aspect of the present disclosure.

FIG. 2 illustrates a flowchart of a method of preventing interference between the opposite sliding doors and wheel 10 according to one aspect of the present disclosure, and FIG. 3 illustrates a specific process of a third step according to one aspect of the present disclosure.

Referring to FIGS. 2 and 3, the method of preventing interference between the opposite sliding doors and the wheel 10 according to one aspect of the present disclosure may include first to third steps.

In the first step, the door opening/closing switch 20 may transmit, to the door controller 50 the user's manipulation signal for opening or closing the door.

In the second step, the door position sensor 40 may transmit the door position information to the door controller 50, and the steering controller 30 may transmit the steering angle information to the door controller 50. In the third step, based on whether the wheel 10 is in the aligned state in which the wheel 10 is parallel to the longitudinal direction of the vehicle, the door controller 50 may determine whether the wheel 10 and the door are in the interference state.

The third step of determining the aligned state of the wheel 10 or the interference state between the wheel 10 and the door may further include a process of determining whether the wheel 10 is in the aligned state and a process of determining whether a radius of rotation of the wheel 10 is in a region in which the door is operable.

In the fourth step, the warning device warns the user of the interference state when the door and the wheel are in the interference state, and the motor 60 may operate the door when the door and the wheel are not in the interference state.

Figure 4:
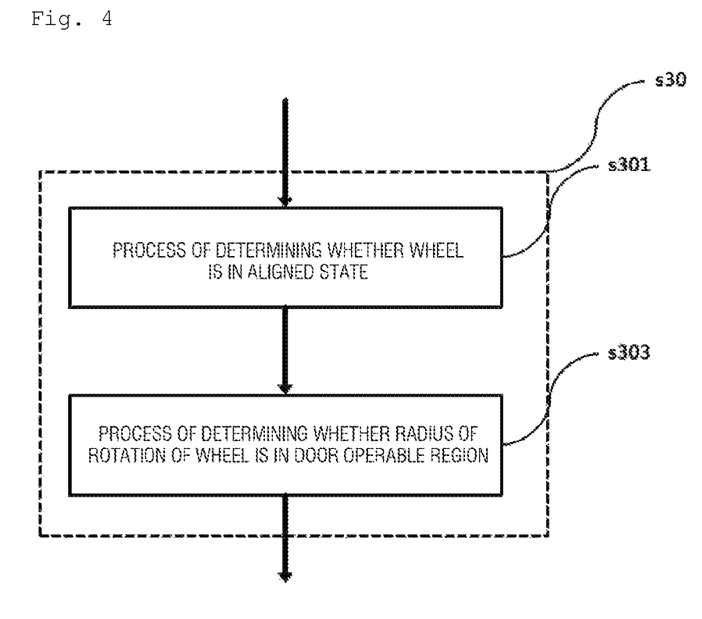
FIG. 4 is a view illustrating a rotation trajectory of the wheel in accordance with an aligned state of the wheel and an operable state of the door.

Referring to FIG. 4, the aligned state of the wheel 10 refers to a case in which the wheel 10 is parallel to the longitudinal direction of the vehicle and the steering angle is '0', and the interference state refers to a case in which the wheel 10 is not in the aligned state. The region may be classified into Region A and Region B depending on a rotation trajectory of the wheel 10 in accordance with the aligned state of the wheel 10 and whether the door is operable.

Region A refers to the rotation trajectory of the wheel 10 in which the door may operate when the user attempts to open the door but the wheel 10 and the door may collide with each other if the steering operation is further performed. Region B refers to the rotation trajectory of the wheel 10 in which the wheel 10 and the door collide with each other when the user attempts to open the door.

In a case in which the wheel 10 is positioned in Region A, the steering controller 30 may restrict the steering angle of the vehicle to a range in which the door and the wheel 10 do not collide with each other, the indication controller may generate a visual warning on the display in the vehicle, and simultaneously, the buzzer 80 may generate a discontinuous warning sound.

In contrast, in a case in which the wheel 10 is positioned in Region B, the steering controller 30 restricts the steering angle of the vehicle to the range in which the door and the wheel 10 do not collide with each other, and the indication controller generates a visual warning on the display in the vehicle, in the same manner as in the case of Region A. However, unlike the case of Region A, the buzzer 80 may generate a continuous warning sound.

In Region A, the discontinuous warning sound outputted by the buzzer 80 has a generation period that increases as the wheel 10 becomes close to the aligned state, and decreases as the wheel 10 becomes distant from the aligned state, and as a result, the continuous warning sound is generated when the wheel 10 enters Region B.

Figure 5A:
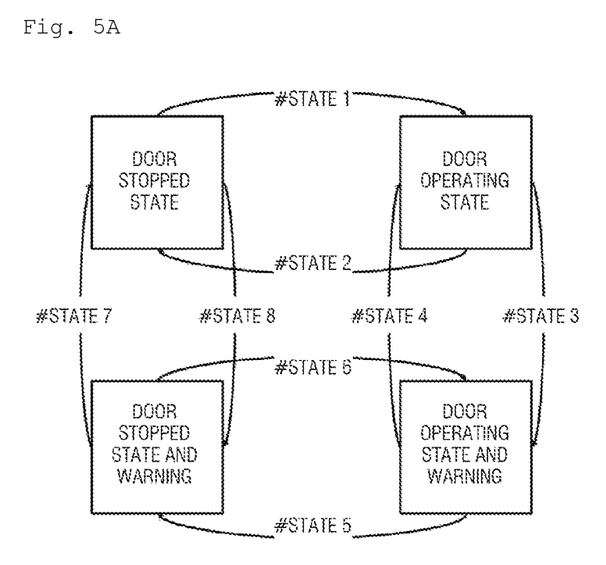
FIGS. 5A and 5B are views illustrating a method of preventing interference between the opposite sliding doors and the wheel according to one aspect of the present disclosure in accordance with a change in wheel state.
Figure 5B:
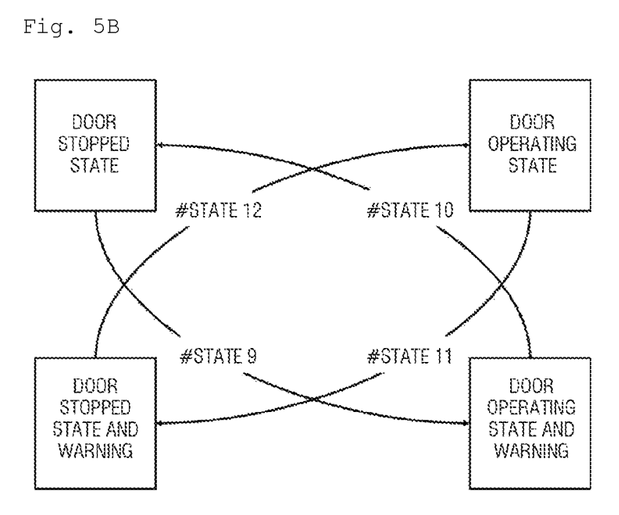

FIGS. 5A and 5B illustrate the method of preventing interference between the opposite sliding doors and the wheel 10 according to one aspect of the present disclosure in accordance with a change in state of the wheel 10.

Transition processes from State 1 to State 8 may be ascertained with reference to FIG. 5A, and transition processes from State 9 to State 12 may be ascertained with reference to FIG. 5B.

A door stopped state refers to a state in which the door is stopped after being opened or closed or the door is stopped by the user's intention while the door is being opened or closed, that is, the door stopped state means a state in which the wheel 10 is positioned in the aligned state while the door is being operated.

A door operating state means a case in which the door is moved by the user's instruction for opening or closing the door.

A door operating state and warning means a state in which the door is being opened or closed when the wheel 10 is in Region A.

A door stopped state and warning means a state in which the door is stopped after being opened or closed when the wheel 10 is in Region A or the door is stopped by the user's intention while the door is being opened or closed, and means a state in which the door is stopped when the wheel 10 reaches Region B.

Hereinafter, warning methods of the warning device according to one aspect of the present disclosure are defined as follows.

TABLE 1

| Warning Items | Operating Warning device | Warning Method |
| --- | --- | --- |
| Warning 1 | Indication Controller 70 | Generate visual warning |
| Warning 2 | Steering Controller 30 | Restrict Steering Angle |
| Warning 3 | Buzzer 80 | Discontinuous Warning sound |
| Warning 4 | Buzzer 80 | Continuous Warning sound |

State 1 refers to a state in which the user inputs the manipulation instruction for opening or closing the door through the door opening/closing switch 20 when the wheel 10 is in the aligned state, such that the door is operated. State 2 refers to a state in which the operation of the door, which is being operated when the wheel 10 is in the aligned state, ends or the door stops operating as the user inputs an instruction for stopping the door.

Between States 1 and 2, the wheel 10 is positioned in the aligned state before and after the door is operated, and as a result, none of Warning 1 to Warning 4 is generated.

State 3 refers to a case in which the wheel 10 rotates from the aligned state to Region A while the door is being operated. In this case, as the wheel 10 enters Region A, Warning 1, Warning 2, and Warning 3 are generated. As the wheel 10 becomes distant from the aligned state, the generation period of the discontinuous warning sound decreases.

State 4 refers to a case in which the wheel 10 rotates from Region A to the aligned state while the door is being operated. As the wheel 10 becomes closer to the aligned state, the generation period of the discontinuous warning sound increases. When the wheel 10 consequently comes into the aligned state, Warning 1 to Warning 3 including the warning sound disappear.

State 5 refers to a case in which the steering angle of the wheel 10 increases while the door is being operated, that is, a case in which the position of the wheel 10 is in Region A or Region B when the wheel 10 rotates from Region A to Region B or the wheel 10 rotates in Region A and the operation of the door ends.

Warning 1 to Warning 3 are generated in the case in which the wheel 10 rotates from Region A to Region B. When the wheel 10 consequently enters Region B as the steering angle increases, Warning 1, Warning 2, and Warning 4 are generated, such that the continuous warning sound is generated.

There is no difference in that Warning 1 to Warning 3 are generated in the case in which the wheel 10 rotates in Region A, but the generation period of the discontinuous warning sound decreases as the steering angle increases.

Contrary to State 5, State 6 refers to a case in which the steering angle of the wheel 10 decreases while the stopped door is being operated, that is, a case in which the wheel 10 rotates in Region A or rotates from Region B to Region A. State 6 may be described as a mechanism opposite to that of State 5.

State 7 refers to a case in which the wheel 10 rotates from Region A or Region B to the aligned state in a state in which the door is stopped. Since the door is stopped while the wheel 10 is rotating, none of Warning 1 to Warning 4 is generated.

State 8 refers to a case in which the wheel 10 rotates to Region B after the wheel 10 is in the aligned state in a state in which the door is stopped. In this case, when the user operates the door opening/closing switch 20, Warning 1, Warning 2, and Warning 4 are generated.

State 9 refers to a case in which the user inputs the manipulation instruction for opening or closing the door through the door opening/closing switch 20 when the wheel 10 is in the aligned state or Region A, and thus the wheel 10 enters Region A as the steering angle of the wheel 10 increases while the door is being operated. In this case, Warning 1, Warning 2, and Warning 3 are generated, and the generation period of the discontinuous warning sound decreases as the wheel 10 becomes distant from the aligned state.

State 10 refers to a case in which the steering angle of the wheel 10 decreases, and the wheel 10 consequently comes into the aligned state when the wheel 10 rotates in Region A and the operation of the door ends. As the wheel 10 becomes closer to the aligned state, the generation period of the discontinuous warning sound increases. When the wheel 10 consequently comes into the aligned state, Warning 1 to Warning 3 including the warning sound disappear.

State 11 refers to a case in which the steering angle of the wheel 10 increases while the door is being operated, that is, a case in which the position of the wheel 10 is in Region A or Region B when the wheel 10 rotates in the aligned state and the operation of the door ends.

Warning 1 to Warning 3 are generated in the case in which the wheel 10 rotates to Region A. When the wheel 10 consequently enters Region B as the steering angle increases, Warning 1, Warning 2, and Warning 4 are generated, such that the continuous warning sound is generated.

State 12 refers to a case in which the steering angle of the wheel 10 decreases while the door is being operated, and the wheel 10 rotates in Region A or Region B to come into the aligned state. Warning 1 and Warning 2 are maintained when the wheel 10 enters Region A from Region B, but the warning sound of the buzzer 80 is changed from the continuous warning sound to the discontinuous warning sound. The generation period of the discontinuous warning sound increases as the wheel 10 in Region A becomes closer to the aligned state. When the wheel 10 consequently comes into the aligned state, Warning 1 to Warning 3 including the warning sound disappear.

While the present disclosure has been described in detail above with reference to the representative exemplary embodiment, those skilled in the art to which the present disclosure pertains will understand that the exemplary embodiment may be variously modified without departing from the scope of the present disclosure. Accordingly, the scope of the present disclosure should not be limited to the described exemplary embodiment, but should be defined not only by the appended claims but also by all changes or modified forms induced from an equivalent concept to the claims.

What is claimed is:

1. A wheel interference prevention system for preventing a wheel and a sliding door of a vehicle from collision at a time of opening and closing of the sliding door, the system comprising:
    a door opening and closing switch receiving an opening and closing operation command of the sliding door from a user;
    a door position sensor for detecting a position of the sliding door;
    a steering controller for measuring a steering angle of the vehicle;
    a door controller configured to:
        receive, from the door opening and closing switch, a manipulation signal for opening or closing the sliding door,
        receive door position information from the door position sensor,
        receive steering angle information from the steering controller, and
        determine that the sliding door and the wheel are in an interference state, in a case that the wheel is not aligned in parallel with a longitudinal direction of the vehicle, at a time of the user attempting to open the sliding door; and
    a warning device configured to warn the user of a dangerous situation in a case that the door controller determines that the sliding door and the wheel are in the interference state.

2. The system of claim 1, wherein, in a case that the door controller determines that the wheel and the sliding door are in the interference state, based on a position of the sliding door or an opening and closing operation state of the sliding door and a position of the wheel, the steering controller restricts the steering angle to a range where the wheel and the sliding door do not collide with each other.

3. The system of claim 1, wherein the warning device further includes:
   an indication controller configured to visually warn the user of the interference state; and
   a buzzer for generating a warning sound about the interference state to the user.

4. The system of claim 1, wherein, in a case that the sliding door and the wheel are not in the interference state, the door controller opens or closes the sliding door by a motor.

5. A method of preventing interference between a sliding door and a wheel, the method comprising:
   a first step of transmitting, by a door opening and closing switch, a user's manipulation signal for opening or closing the sliding door to a door controller;
   a second step of transmitting, by a door position sensor, door position information to the door controller and transmitting, by a steering controller, steering angle information to the door controller;
   a third step of determining, by the door controller, whether the wheel and the sliding door are in an interference state, based on whether the wheel is in an aligned state where the wheel is in parallel with a longitudinal direction of a vehicle; and
   a fourth step of warning, by a warning device, a user of the interference state in a case that the sliding door and the wheel are in the interference state or operating, by a motor, the sliding door in a case that the sliding door and the wheel are not in the interference state.

6. The method of claim 5, wherein the third step further includes:
   a process of determining whether the wheel is in the aligned state; and
   a process of determining whether a radius of rotation of the wheel is in a region where the sliding door is operable.

7. The method of claim 6, wherein in the interference state,
   in a case that the radius of rotation of the wheel is in a region where the sliding door is operable, an indication controller generates a visual warning, and simultaneously, a buzzer generates a discontinuous warning sound, and
   in a case that the radius of rotation of the wheel is in a region where the sliding door is inoperable, the indication controller generates a visual warning, and simultaneously, the buzzer generates a continuous warning sound.

8. The method of claim 7, wherein the buzzer outputs the discontinuous warning sound having a generation period that increases as the wheel becomes closer to the aligned state.

9. The method of claim 5, wherein in the interference state, the steering controller restricts a steering angle of the vehicle to a range where the sliding door and the wheel do not collide with each other.

* * * * *

UNITED STATES PATENT AND TRADEMARK OFFICE
CERTIFICATE OF CORRECTION

| | | |
|---|---|---|
| PATENT NO. | : 11,598,137 B2 | Page 1 of 1 |
| APPLICATION NO. | : 16/678150 | |
| DATED | : March 7, 2023 | |
| INVENTOR(S) | : Jun-Hyuk Kim et al. | |

It is certified that error appears in the above-identified patent and that said Letters Patent is hereby corrected as shown below:

On the Title Page

Column 1 before Item (65), insert:
-- (30) Foreign Application Data:
Nov. 30, 2018 (KR) .......................... 10-2018-0152560 --

Signed and Sealed this
Eleventh Day of June, 2024

Katherine Kelly Vidal
*Director of the United States Patent and Trademark Office*